United States Patent
Niemann et al.

(10) Patent No.: US 10,620,130 B2
(45) Date of Patent: Apr. 14, 2020

(54) MEASUREMENT DEVICE FOR MEASURING FINE PARTICULATE MATTER IN AT LEAST ONE VOLUME OF AIR FOR A VEHICLE, PARTICULARLY FOR A MOTOR VEHICLE

(71) Applicant: HELLA GmbH & Co. KGaA, Lippstadt (DE)

(72) Inventors: Thomas Niemann, Delmenhorst (DE); Uwe Roeben, Zetel (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 16/039,825

(22) Filed: Jul. 19, 2018

(65) Prior Publication Data

US 2019/0033224 A1 Jan. 31, 2019

(30) Foreign Application Priority Data

Jul. 28, 2017 (DE) .......... 10 2017 117 132

(51) Int. Cl.
| | |
|---|---|
| *G01N 21/85* | (2006.01) |
| *G01N 15/02* | (2006.01) |
| *G01N 21/53* | (2006.01) |
| *G01N 21/15* | (2006.01) |
| *G01N 21/39* | (2006.01) |
| *G01N 15/00* | (2006.01) |

(52) U.S. Cl.
CPC ......... *G01N 21/85* (2013.01); *G01N 15/0205* (2013.01); *G01N 15/0211* (2013.01); *G01N 21/15* (2013.01); *G01N 21/39* (2013.01); *G01N 21/53* (2013.01); *G01N 2015/0046* (2013.01); *G01N 2021/151* (2013.01); *G01N 2021/8578* (2013.01); *G01N 2201/022* (2013.01)

(58) Field of Classification Search
CPC ........ G01N 21/85; G01N 21/15; G01N 21/39; G01N 2021/151
USPC ......................... 356/627, 438, 439
See application file for complete search history.

(56) References Cited

U.S. PATENT DOCUMENTS

| | | | | |
|---|---|---|---|---|
| 3,790,289 A | | 2/1974 | Schmidt | |
| 3,885,162 A | * | 5/1975 | Geertz ................. | G01N 21/534 250/573 |
| 4,017,193 A | * | 4/1977 | Loiterman ........... | G01N 21/534 356/435 |
| 4,204,768 A | * | 5/1980 | N'Guyen ............... | G01N 21/37 250/343 |
| 4,640,621 A | * | 2/1987 | Rose .................... | G01N 21/255 356/243.2 |

(Continued)

*Primary Examiner* — Roy M Punnoose
(74) *Attorney, Agent, or Firm* — Muncy, Geissler, Olds & Lowe, PC

(57) ABSTRACT

In a measurement device for measuring fine particulate matter in at least one volume of air for a vehicle, particularly for a motor vehicle, having at least one laser light source, having at least one calibration device assigned to the laser light source, and having at least one measurement chamber, it is provided according to the invention that the at least one laser light source is assigned to at least two measurement chambers, the measurement chambers are formed by segments of air handling ducts to direct the air volumes to be tested, and at least one optical receiving device is assigned to each measurement chamber.

12 Claims, 2 Drawing Sheets

(56) References Cited

U.S. PATENT DOCUMENTS

| | | | |
|---|---|---|---|
| 7,268,881 B2 * | 9/2007 | Larsen | G01N 21/0303 356/246 |
| 2003/0016357 A1 * | 1/2003 | Shofner | G01N 15/0211 356/337 |
| 2003/0202179 A1 | 10/2003 | Larsen et al. | |
| 2018/0038790 A1 * | 2/2018 | Ostertag | B29C 48/92 |

* cited by examiner

MEASUREMENT DEVICE FOR MEASURING FINE PARTICULATE MATTER IN AT LEAST ONE VOLUME OF AIR FOR A VEHICLE, PARTICULARLY FOR A MOTOR VEHICLE

BACKGROUND OF THE INVENTION

(1) Field of the Invention

The invention relates to a measurement device for measuring fine particulate matter in at least one volume of air for a vehicle, particularly for a motor vehicle, having at least one laser light source, having at least one calibration device assigned to the laser light source, and having at least one measurement chamber.

(2) Description of Related Art

Measurement devices of the type described in the introduction are known for example as fine particulate matter sensors in the motor vehicle industry. In such cases, a volume of air is analysed in a measurement chamber with an optical system. For example, the particle sizes of the fine particulate matter in the volume of air can be determined in the measurement chamber by various methods. In particular in such cases, the air volumes containing the fine particulate matter that are to be tested are analysed with the aid of a laser beam, wherein for example the changes in the laser beam and the reflections and/or refractions of the laser light are tested on the fine particulate matter particles. In order guarantee reliable measurements, it is necessary to ensure that fine particulate matter does not collect in the measurement chambers, where it can distort subsequent measurements. For this purpose, the measurement chambers may be cleaned at regular intervals, for example. Particularly when a measurement device of the type described in the introduction is used in a motor vehicle that is operated in regions with elevated levels of fine particulate matter, it is necessary not only to measure the air in the interior of the motor vehicle but also to measure the ambient air outside the motor vehicle, to determine for example whether it is beneficial to replace the internal air with the external air. This usually entails considerable design effort to enable parallel analyses to take place. One disadvantage of the known prior art is that in order to clean the measurement chambers the measurement chambers have to be flushed continually with purified air. Consequently, it is not possible to carry out measurements continuously, since the measurements have to be interrupted to allow for the flushing cycles.

BRIEF SUMMARY OF THE INVENTION

The object underlying the invention is to suggest a compact measurement device for measuring fine particulate matter in air volumes with which a continuous cleaning of the measurement chambers is enabled.

In a measurement device for measuring fine particulate matter in at least one volume of air for a vehicle, particularly for a motor vehicle, having at least one laser light source, having at least one calibration device assigned to the laser light source, and having at least one measurement chamber, it is provided as essential to the invention that the at least one laser light source is assigned to at least two measurement chambers, that the measurement chambers are embodied as line segments of air handling ducts for guiding the air volumes to be tested, and that at least one optical receiver device is assigned to each measurement chamber.

The measurement device includes air handling ducts for guiding the air volumes that are to be tested for the fine particulate matter content. In this context, at least sections of the air handling ducts may be of substantially tubular construction. The air volumes to be tested may be guided in the form of air streams through the tubular air handling ducts to the measurement chambers. In order to prevent turbulence of the air streams in the measurement chambers, the measurement chambers are constructed as line segments of the air handling ducts. With the measurement chambers constructed as line segments, no additional turbulence is created in the air stream to be tested as is the case at the transition of an air handling duct into an measurement chamber with different geometry, for example. A laser light source which emits laser light may be used to test the air volumes. In this context, the beam path of the laser light is arranged so that it passes through the defined measurement chambers. An optical receiving device, in the form of a photodiode or similar component for example, is assigned to each measurement chamber. The laser light that passes through a measurement chamber is reflected, scattered or otherwise influenced by the fine particulate matter present in the measurement chamber. The laser light which is scattered or reflected by the particles may be captured by the optical receiving devices. Conclusions may be drawn regarding the concentration of the fine particulate matter, for example, the particle size or other information about the particles in the fine particulate matter from the laser light which is influenced by the particles. For example, air streams from different areas of a motor vehicle may be fed to the measurement device and may be tested in parallel. In particular in this context, the air surrounding the vehicle and the air in the vehicle interior may be tested. For example, one laser light source may be assigned to several measurement chambers, so that measurements in the measurement chambers may be enabled by just one laser light source. This results in a smaller number of components to be mounted and particularly in significantly less effort required to adjust the light source. Moreover, the use of a laser light source for multiple measurement chambers means that the construction of the measurement device can be very compact.

In a further development of the invention, the measurement device includes at least two air handling ducts for guiding air streams that contain fine particulate matter, at least two air handling ducts each include at least one area which is permeable to laser light, and the beam path of the laser light emitted by the laser light source traverses the measurement chambers formed by the air handling ducts. In order to create the measurement chambers with line segments of the air handling ducts, at least sections of the air handling ducts include regions which are permeable to laser light. The regions which are permeable to laser light may be window openings, for example. In such a case, the window openings may be covered with material that is permeable to laser light, such as glass material, or they may allow the laser light to pass without any further covering. The beam path of the laser light may traverse the measurement chambers formed by the air handling ducts, that is to say it may pass through the air volumes to be tested through the regions of the air handling ducts that are permeable to laser light. The laser light which is influenced by the fine particulates contained in the air volumes may be detected and evaluated by optical receiving devices. The creation of measurement chambers from the air handling ducts is thus made possible, and an air duct with minimal turbulence of the particulate streams is provided.

In a further development of the invention, the beam path of the laser light is arranged transversely to the direction of flow of the air handling ducts. The air handling ducts that guide the air volumes to be tested in the form of air streams may by arranged side by side, for example. To enable the laser light to pass through the measurement chambers of both handling ducts, the laser light source is arranged beside the air handling ducts, and the beam path of the laser light emitted by the laser light source is directed transversely to the direction of flow of the air streams that are to be tested. This makes it possible for the laser light to pass through both measurement chambers and enables parallel testing of the measurement chambers, which are arranged side by side.

In a further development of the invention, the beam path of the laser light emitted by the laser light source and the direction of flow of the air handling ducts form a right angle. The laser light source is preferably arranged beside the air handling ducts that form the measurement chambers. In such case, the beam path is aligned so that the emitted laser beam forms a right angle with the direction of flow of the air streams to the tested in the air handling ducts. This arrangement of the beam path and the air handling ducts at right angles to each other ensures that it is easily possible to test the different air streams in parallel.

In a further development of the invention, the line segments of the air handling ducts which are designed as measurement chambers are arranged parallel to each other, the regions of the line segments that are permeable to laser light and the beam path of the laser light emitted by the laser light source are arranged in one axis to enable the laser light to pass through both line segments. In order to form the measurement chambers, the air handling ducts have line segments which include openings in the walls of the air handling duct to allow the laser light to pass through. The air handling ducts are substantially tubular, and the axes of longitudinal symmetry of the air handling ducts for the various air streams for testing are aligned substantially parallel to each other. The parallel arrangement of the air handling ducts and the arrangement of the beam path of the laser light as well as the that of the openings in the air handling ducts to allow the laser light to pass through in one axis make it possible to carry out parallel measurements of the various air streams.

In a further development of the invention, the air handling ducts are substantially tubular, the line segments that form the measurement chambers each included two regions which are permeable to laser light to allow the beam path of the laser light to pass through, and at least one body that is permeable to laser light is arranged between the duct sections. The air handling ducts may have lateral openings in the walls in the duct sections which form the measurement chambers to allow the beam path of the laser light emitted by the laser light source to pass through the air handling ducts. The lateral openings which form the regions permeable to laser light and the beam path of the laser light are arranged in the same axis, so that the laser light beam can pass through both air handling ducts. In particular, the beam path and the axes of symmetry of the openings perpendicular to the opening surfaces are aligned parallel to each other and/or are coincident. In order to prevent an exchange of gases between the air handling ducts, a translucent but gas-impermeable body, particularly a glass body may be arranged between the air handling ducts. The glass body may provide a gas-impermeable seal at least on one side of the air handling ducts. In this way, and exchange of air between the air handling ducts and therewith a distortion of the measurement results due to mixing of the air streams is prevented entirely.

In a further development of the invention, at least one air handling duct is embodied as an interior air handling duct for carrying air from the interior of the vehicle, and at least one air handling duct is embodied as an ambient air handling duct for carrying air from outside the vehicle. It is essential to test the concentration of fine particulate matter particles in the air surrounding a vehicle and of the air in a vehicle interior particularly in areas in which the ambient air holds a heavy burden of fine particulate matter, in order to decide whether it will be advantageous to replace the air inside the vehicle with the air that surrounds the vehicle. One air handling duct may be embodied as an ambient air handling duct for testing the interior air and the ambient air of the vehicle. Ambient air collected by an ambient air feed is passed through the ambient air handling duct to the measurement device, where the ambient air can be tested for its particulate matter content in the line segment that is embodied as a measurement chamber. In the same way, one air handling duct is embodied as an air handling duct for interior air, and has an interior air feed through which the interior air may be transported to the measurement device.

In a further development of the invention, a sheath air feed is assigned to at least one air handling duct. The sheath air may be an air stream which surrounds the air stream that is to be tested, that is to say the air stream that contains fine particulate matter for example, in the manner of an envelope. The sheath air is preferably purified air, which preferably contains no fine particulate matter. The sheath air is supplied to the ambient air stream or the interior air stream for example through the sheath air feed. The sheath air feed may be for example a feed connection, i.e. a pipe connection which opens into the air handling duct. This particularly enables the sheath air feed to be arranged at right angles to the direction of flow of the air in the air handling ducts. The sheath air is introduced into the air handling ducts. The introduction of a stream of purified sheath air which surrounds the air stream containing fine particulate matter like an envelope ensures that the measurement chambers are cleaned constantly, since the stream of sheath air prevents fine particulate matter from collecting in the measurement chambers. Thus, additional flushing of the measurement chambers with purified air is not necessary.

In a further development of the invention, the sheath air feed includes at least one air filter for cleaning the air which is supplied as sheath air, and the at least one air filter is arranged in front of the point at which the sheath air feed opens into the line segments. The sheath air used to clean the measurement chambers is preferably made up of air that may be collected from outside the vehicle, or even from the vehicle interior and which undergoes a purification process before it is used. For this purpose, the sheath air feed includes at least one air filter by which the air that is collected for use as sheath air is cleaned. In particular, the air filter is arranged before the point at which the sheath air feed opens into the air handling duct. The arrangement of an air filter enables the air which is available as sheath air to be used to clean the measurement areas.

In a further development of the invention, a laser light reducing device is assigned to the laser light source, and the laser light reducing device is arranged in the beam path of the laser light behind the measurement chambers. In order to prevent the laser light from being reflected and passing back into the two measurement chambers after it has passed through them, the measurement device includes a laser light reducing device. The laser light reducing device is arranged in the beam path of the laser light behind the measurement chambers. The measurement chambers are thus positioned between the laser light source and the laser light reducing device. In this context, the laser light reducing device may include a semi-transparent mirror, which reflects for example 90% of the light. In particular, the mirror is arranged at an angle of 45° to the laser beam path, so that the laser light is redirected through an angle of 90° after passing through the measurement chambers. The reflected laser light reaches a kind of attenuation area, in which the laser light is reflected repeatedly until the intensity of the laser light approaches zero. In this way, the laser light is prevented from being reflected back into the measurement chambers and distorting the measurements.

In a further development of the invention, a calibration device is assigned to the laser light source for calibrating the laser light source, and the calibration device is arranged in the beam path of the laser light behind the measurement chambers. The measurement device includes a calibration device to enable the laser light source to be calibrated. The calibration device may be for example a photodiode or a similar optically active component with which the laser light can be detected. In particular, the calibration device is arranged in the laser beam path behind the measurement chambers. The calibration device may for example include a mirror which is arranged at an angle of 45° to the laser beam path. In particular, this mirror may be arranged in the beam path behind the semi-transparent mirror of the laser light reducing device. The laser light incident on the mirror is directed to the photodiode, where it can be detected. Thus for example the alignment of the laser beam or the intensity of the laser light may be adjusted.

A further aspect of the invention relates to a vehicle equipped with a measurement device according to the invention. The measurement device according to the invention is particularly suitable for use in vehicles, particularly motor vehicles. For example, the measurement device may installed as a module in existing air handling ducts. This enables the particulate matter content in both the ambient air and in the interior air of the vehicle to be monitored.

BRIEF DESCRIPTION OF THE DRAWINGS

In the following section, the invention will be explained further with reference to the embodiment represented in the drawing. In detail.

DETAILED DESCRIPTION OF THE INVENTION

Figure 1:
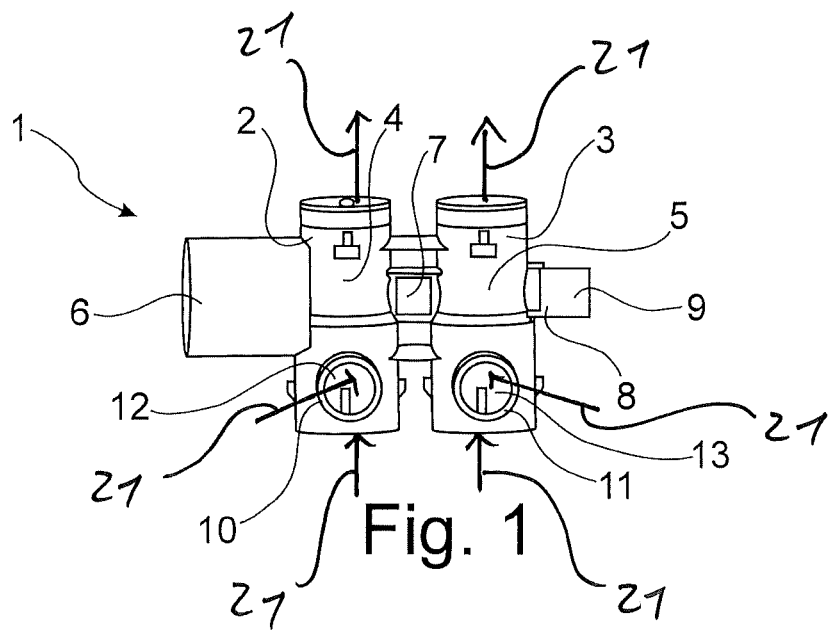
FIG. 1: is a schematic representation of a measurement device in a perspective external view.

FIG. 1 represents a measurement device 1 in a perspective external view. Measurement device 1 includes two air handling ducts 2, 3, which are arranged parallel to each other. In this context, one air handling duct 2 is embodied as an ambient air handling duct, and one air handling duct 3 is embodied as an interior air handling duct. Air handling ducts 2, 3 include air duct sections 4, 5, which are designed as measurement chambers. The air flow and its direction are indicated by the arrows 21. Air duct sections 4, 5 include lateral openings through which a laser beam emitted by a laser light source 6 may pass. A body that is permeable to laser light 7, particularly a glass body, is arranged between air duct sections 4, 5. The measurement chambers formed by air duct sections 4, 5 are separated by the body that is permeable to laser light 7. A laser light reducing device 8 and a calibration device 9 are arranged behind the measurement chambers in the course of the laser light beam path. One sheath air feed 10, 11, through which sheath air may be fed into air handling ducts 2, 3 is assigned to each air handling ducts 2, 3. Air filters 12, 13 are arranged between each sheath air feed 10, 11 and the respective air handling duct 2, 3. Ambient air, for example, may be cleaned by air filters 12, 13, so that it can be used as clean sheath air for the air stream charged with fine particulate matter that is to be tested.

Figure 2:
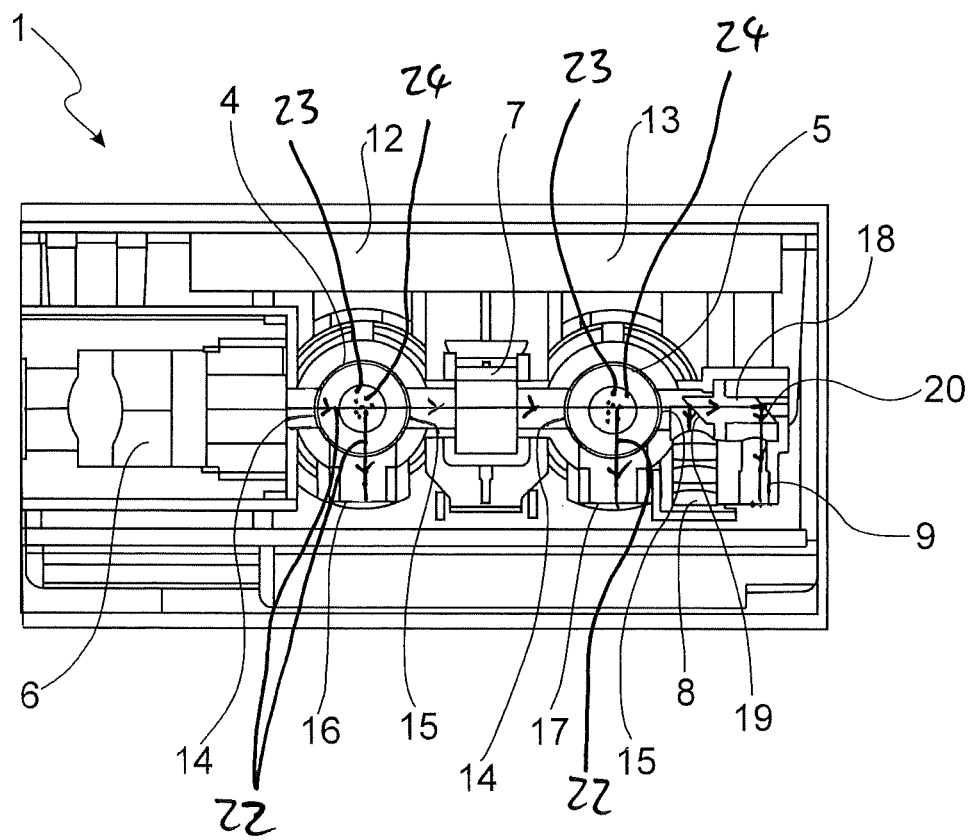
FIG. 2: s a schematic representation of a measurement device in a partly cross-sectional view.

FIG. 2 represents a cross sectional view of a measurement device 1 according to FIG. 1. Identical components are identified with the same reference signs. Air handling ducts 2, 3 have regions 14, 15 that are permeable to laser light, through which the laser light 22 emitted by the laser light source 6 can pass. The regions 14, 15 that are permeable to laser light may be formed for example by openings in the pipelines of air handling ducts 2, 3. The air handling ducts 2, 3 are separated from each other in gas-tight manner by the body 7 that is permeable to laser light. The measurement chambers 23, formed by air duct sections 4, 5, are each equipped with optical receiving devices 16, 17, by which the laser light 22 radiation scattered by the fine particulate matter 24 in the air volumes to be tested can be detected. An optical component 18 incorporating a semi-transparent mirror 19 is arranged behind the measurement chambers in the beam path 22 of the laser light. For example, this semi-transparent mirror 19 may be arranged at an angle of 45° to the propagation axis of the laser light 22 and may reflect about 90% of the light and allow 10% of the light to pass through. Semi-transparent mirror 19 serves to direct the emitted laser light to a laser light reducing device 8, in which the intensity of the laser light 22 is attenuated by repeated reflection for example. Laser light reducing device 8 serves to prevent laser light from being reflected back into the measurement chambers after it has passed through them. In addition, optical component 18 includes a second mirror 20 which directs the laser light 22 that passes through semi-transparent mirror 19 to a calibration device 9. Calibration device 9 serves to enable calibration and adjustment of laser light source 6.

Figure 3:
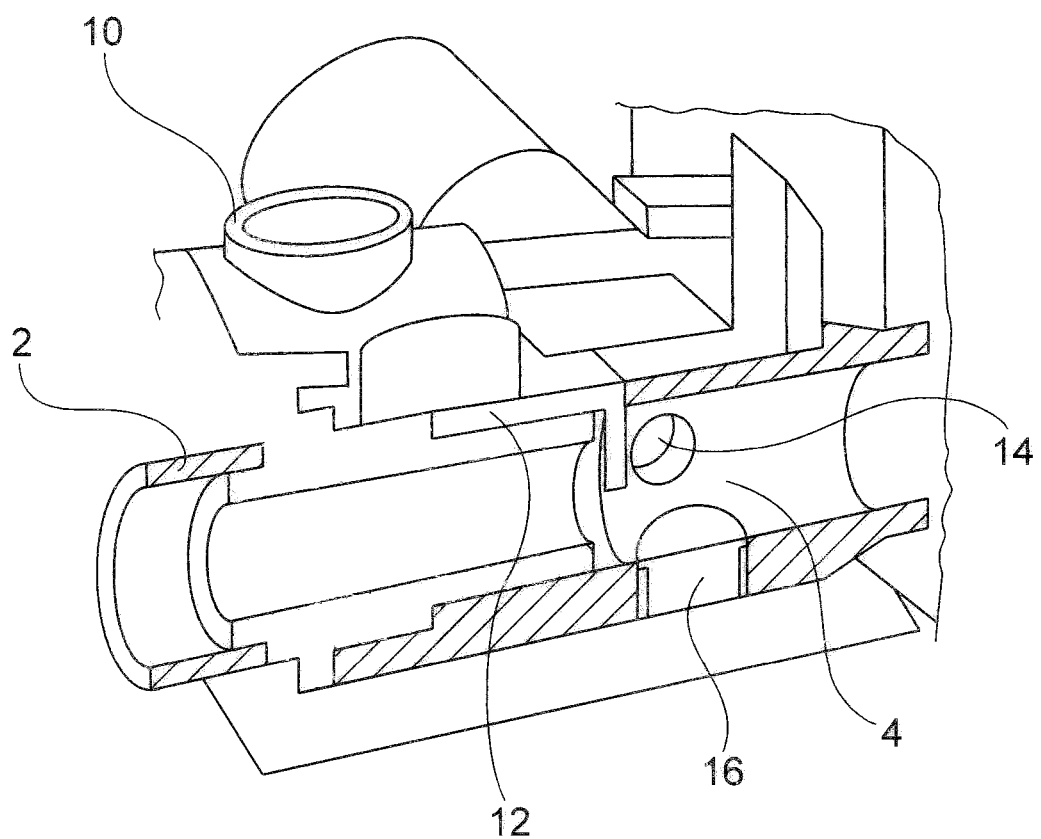
FIG. 3: is a partial cutaway view of a measurement device according to FIG. 2.

FIG. 3 shows a partial cutaway view of a partial cross section of the measurement device 1 of FIGS. 1 and 2. Identical components are identified with the same reference signs. Sheath air feed 10 serves to direct sheath air into air handling duct 2 through a filter 12. The cleaned sheath air surrounds the air stream containing the particles. The air stream containing fine particulate matter which is surrounded by the sheath air is directed into the air duct sections 4 which are embodies as measurement chambers, where it is examined by means of laser light.

All of the features presented in the preceding description and in the claims can be implemented in any selection of the features of the independent claim in any combination. The disclosure of the invention is thus not limited to the feature combinations described and/or claimed, but rather all meaningful feature combinations are to be considered disclosed within the scope of the invention.

The invention claimed is:

1. A measurement device for measuring at least one attribute of fine particulate matter in at least one volume of air for a vehicle, comprising:
   at least one laser light source, at least one calibration device assigned to configured to calibrate and adjust the laser light source, at least two measurement chambers, at least two air handling ducts, at least one optical receiving device arranged at each measurement chamber, wherein the at least one laser light source emits laser light through the at least two measurement chambers, and the measurement chambers are configured to be line segments of the air handling ducts for guiding the at least one volume of air to be tested.

2. The measurement device according to claim 1, further comprising at least two air handling ducts for guiding air streams containing fine particulate matter, wherein each of the at least two air handling ducts comprises at least one region that is light transmissive to the laser light, and a beam path of the laser light emitted by the laser light source traverses the measurement chambers formed by the air handling ducts.

3. The measurement device according to claim 1, wherein the beam path of the laser light is transverse to a direction of flow of the air handling ducts.

4. The measurement device according to claim 1, wherein the beam path of the laser light emitted by the laser light source and the direction of flow of the air handling ducts form a right angle.

5. The measurement device according to claim 1, wherein the measurement chambers are arranged parallel to each other, the line segments that form the measurement chambers each comprises two regions that are light transmissive to the laser light, the regions of the line segments and the beam path of the laser light emitted by the laser light source are configured to allow the laser light to pass through both line segments in one axis.

6. The measurement device according to claim 1, wherein the air handling ducts are substantially tubular, and at least one body that is light transmissive to the laser light is configured between air duct sections.

7. The measurement device according to claim 1, wherein the at least one air handling duct is configured to be an interior air handling duct for directing air from an interior of the vehicle and at least one air handling duct is configured to be an ambient air handling duct for directing air from outside of the vehicle.

8. The measurement device according to claim 1, wherein at least one sheath air feed connect to the at least one air handling duct.

9. The measurement device according to claim 8, wherein the sheath air feed comprises at least one air filter for cleaning air supplied as sheath air, and at least one air filter is arranged before a point at which the sheath air feed opens to the line segments.

10. The measurement device according to claim 1, further comprising a laser light reducing device configured in the beam path of the laser light behind the measurement chambers.

11. The measurement device according to claim 1, further comprising a calibration device for calibrating the laser light source, wherein the calibration device is configured in the beam path of the laser light behind the measurement chambers.

12. A vehicle having a measurement device according to claim 1.

* * * * *